(12) United States Patent
Huang et al.

(10) Patent No.: US 9,749,024 B2
(45) Date of Patent: Aug. 29, 2017

(54) WIRELESS DEVICES, METHODS, AND COMPUTER READABLE MEDIA FOR MULTI-USER REQUEST-TO-SEND AND CLEAR-TO-SEND IN A HIGH EFFICIENCY WIRELESS LOCAL-AREA NETWORK

(71) Applicant: Intel IP Corporation, Santa Clara, CA (US)

(72) Inventors: Po-Kai Huang, West Lafayette, IN (US); Robert J. Stacey, Portland, OR (US); Chittabrata Ghosh, Fremont, CA (US); Qinghua Li, San Ramon, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/743,837

(22) Filed: Jun. 18, 2015

(65) Prior Publication Data

US 2016/0164654 A1 Jun. 9, 2016

Related U.S. Application Data

(60) Provisional application No. 62/087,027, filed on Dec. 3, 2014, provisional application No. 62/111,809, filed on Feb. 4, 2015.

(51) Int. Cl.
*H04L 12/761* (2013.01)
*H04B 7/0452* (2017.01)
(Continued)

(52) U.S. Cl.
CPC ......... *H04B 7/0452* (2013.01); *H04L 5/0053* (2013.01); *H04W 74/006* (2013.01);
(Continued)

(58) Field of Classification Search
CPC ... H04L 5/0007; H04L 5/0053; H04L 5/0023; H04B 7/0452; H04W 74/006; H04W 76/00; H04W 84/12
See application file for complete search history.

(56) References Cited

U.S. PATENT DOCUMENTS

| | | | | |
|---|---|---|---|---|
| 2011/0150004 A1* | 6/2011 | Denteneer | ............. | H04L 5/0023 370/476 |
| 2012/0147804 A1* | 6/2012 | Hedayat | ............ | H04W 74/0816 370/312 |
| 2014/0369276 A1* | 12/2014 | Porat | ....................... | H04L 5/003 370/329 |

OTHER PUBLICATIONS

"Propsed Specification Framework for TGax", IEEE P802.11 Wireless LANs, (Nov. 11, 2014), 6 pgs.

* cited by examiner

*Primary Examiner* — Omar Ghowrwal
(74) *Attorney, Agent, or Firm* — Schwegman Lundberg & Woessner, P.A.

(57) ABSTRACT

Apparatuses, methods and computer readable media for multi-user request-to-send and clear-to-send are disclosed. An apparatus of a high-efficiency wireless local area network (HEW) master station comprising circuitry is disclosed. The circuitry may be configured to: select a first group of stations to transmit a multi-user request-to-send (MU-RTS) transmission to and generate a MU-RTS packet for the first group of stations. The circuitry may be configured to transmit the MU-RTS packet to the first group of stations. The MU-RTS may include a resource map that indicates a subchannel for each of the first group of stations to receive data on and/or a power control indication for at least one of the stations of the one or more stations. The MU-RTS may indicate that some of the first group of stations should transmit a multi-user clear-to-send (MU-
(Continued)

CTS) and others of the first group of stations should not transmit a MU-CTS.

24 Claims, 6 Drawing Sheets (51) Int. Cl.
*H04W 74/00* (2009.01)
*H04W 76/00* (2009.01)
*H04L 5/00* (2006.01)
*H04W 84/12* (2009.01)
(52) U.S. Cl.
CPC ........... *H04W 76/00* (2013.01); *H04L 5/0007* (2013.01); *H04L 5/0023* (2013.01); *H04W 84/12* (2013.01)

WIRELESS DEVICES, METHODS, AND COMPUTER READABLE MEDIA FOR MULTI-USER REQUEST-TO-SEND AND CLEAR-TO-SEND IN A HIGH EFFICIENCY WIRELESS LOCAL-AREA NETWORK

PRIORITY CLAIM

This application claims the benefit of priority under 35 USC 119(e) to U.S. Provisional Patent Application Ser. No. 62/111,809, filed Feb. 4, 2015, and U.S. Provisional Patent Application Ser. No. 62/087,027, filed Dec. 3, 2014, both of which are incorporated herein by reference in its entirety.

TECHNICAL FIELD

Some embodiments relate to transmitting and receiving packets in wireless local area networks (WLANs) including networks operating in accordance with the Institute of Electronic and Electrical Engineers (IEEE) 802.11 family of standards. Some embodiments relate to IEEE 802.11ax. Some embodiments relate to a master station downloading data to stations using orthogonal frequency division multiple-access (OFDMA) and/or multiple-user multiple-input multiple-output (MU-MIMO). Some embodiments relate to deferring stations that are not part of a multiple-user (MU) download of data. Some embodiments relate to determining with which stations to use multiple-user request-to-send (MU-RTS) and multiple-user clear-to-send (MU-CTS).

BACKGROUND

One issue in WLANs is efficiently using the wireless medium. There may be many stations (STAs) and/or access points (APs) that are sharing the wireless medium. The APs may need to download data to one or more STAs. Additionally, there may be different protocols including legacy protocols using the wireless medium. Moreover, the APs and STAs may need to be compatible with future protocols.

Thus, there are general needs for systems and methods for efficiently using the wireless medium, and in particularly, to efficiently download data from an AP to one or more STAs.

BRIEF DESCRIPTION OF THE DRAWINGS

The present disclosure is illustrated by way of example and not limitation in the figures of the accompanying drawings, in which like references indicate similar elements and in which.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
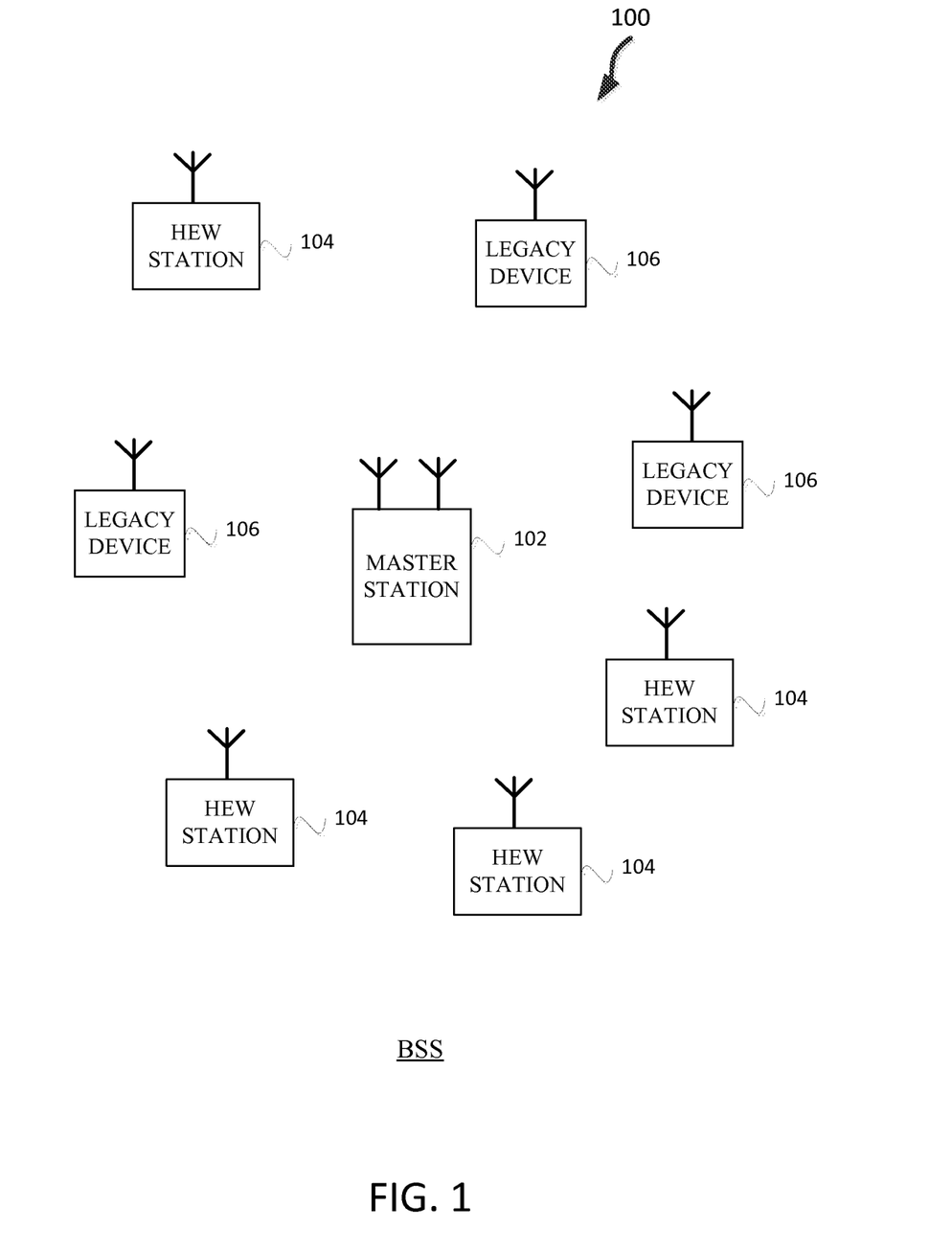
FIG. 1 illustrates a WLAN in accordance with some embodiments.

FIG. 1 illustrates a WLAN 100 in accordance with some embodiments. The WLAN may comprise a basis service set (BSS) 100 that may include a master station 102, which may be an AP, a plurality of high-efficiency wireless (HEW) (e.g., IEEE 802.11ax) STAs 104 and a plurality of legacy (e.g., IEEE 802.11n/ac) devices 106.

The master station 102 may be an AP using the IEEE 802.11 to transmit and receive. The master station 102 may be a base station. The master station 102 may use other communications protocols as well as the IEEE 802.11 protocol. The IEEE 802.11 protocol may be IEEE 802.11ax. The IEEE 802.11 protocol may include using OFDMA, time division multiple access (TDMA), and/or code division multiple access (CDMA). The IEEE 802.11 protocol may include a multiple access technique. For example, the IEEE 802.11 protocol may include space-division multiple access (SDMA) and/or MU-MIMO.

The legacy devices 106 may operate in accordance with one or more of IEEE 802.11a/g/ag/n/ac, or another legacy wireless communication standard. The legacy devices 106 may be STAs or IEEE STAs.

The HEW STAs 104 may be wireless transmit and receive devices such as cellular telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HEW STAs 104 may be termed high efficiency (HE) stations.

The BSS 100 may operate on a primary channel and one or more secondary channels or sub-channels. The BSS 100 may include one or more master stations 102. In accordance with some embodiments, the master station 102 may communicate with one or more of the HEW devices 104 on one or more of the secondary channels or sub-channels or the primary channel. In accordance with some embodiments, the master station 102 communicates with the legacy devices 106 on the primary channel. In accordance with some embodiments, the master station 102 may be configured to communicate concurrently with one or more of the HEW STAs 104 on one or more of the secondary channels and a legacy device 106 utilizing only the primary channel and not utilizing any of the secondary channels.

The master station 102 may communicate with legacy devices 106 in accordance with legacy IEEE 802.11 communication techniques. In example embodiments, the master station 102 may also be configured to communicate with HEW STAs 104 in accordance with legacy IEEE 802.11 communication techniques. Legacy IEEE 802.11 communication techniques may refer to any IEEE 802.11 communication technique prior to IEEE 802.11ax.

In some embodiments, a HEW frame may be configurable to have the same bandwidth as a sub-channel, and the bandwidth may be one of 20 MHz, 40 MHz, or 80 MHz, 160 MHz, 320 MHz contiguous bandwidths or an 80+80 MHz (160 MHz) non-contiguous bandwidth. In some embodiments, bandwidths of 1 MHz, 1.25 MHz, 2.0 MHz, 2.5 MHz, 5 MHz and 10 MHz, or a combination thereof or another bandwidth that is less or equal to the available bandwidth, may also be used. A HEW frame may be configured for transmitting a number of spatial streams, which may be in accordance with MU-MIMO.

In other embodiments, the master station 102, HEW STA 104, and/or legacy device 106 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX®)), BlueTooth®, or other technologies.

Some embodiments relate to HEW communications. In accordance with some IEEE 802.11ax embodiments, a master station 102 may operate as a master station which may be arranged to contend for a wireless medium (e.g., during a contention period) to receive exclusive control of the medium for an HEW control period. In some embodiments, the HEW control period may be termed a transmission opportunity (TXOP). The master station 102 may transmit a HEW master-sync transmission, which may be a trigger frame or HEW control and schedule transmission, at the beginning of the HEW control period. The master station 102 may transmit a time duration of the TXOP and sub-channel information. During the HEW control period, HEW STAs 104 may communicate with the master station 102 in accordance with a non-contention based multiple access technique such as OFDMA or MU-MIMO. This is unlike conventional WLAN communications in which devices communicate in accordance with a contention-based communication technique, rather than a multiple access technique. During the HEW control period, the master station 102 may communicate with HEW stations 104 using one or more HEW frames. During the HEW control period, the HEW STAs 104 may operate on a sub-channel smaller than the operating range of the master station 102. During the HEW control period, legacy stations refrain from communicating. In accordance with some embodiments, during the master-sync transmission the HEW STAs 104 may contend for the wireless medium with the legacy devices 106 being excluded from contending for the wireless medium during the master-sync transmission.

In some embodiments, the multiple-access technique used during the HEW control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

The master station 102 may also communicate with legacy stations 106 and/or HEW stations 104 in accordance with legacy IEEE 802.11 communication techniques. In some embodiments, the master station 102 may also be configurable to communicate with HEW stations 104 outside the HEW control period in accordance with legacy IEEE 802.11 communication techniques, although this is not a requirement.

In example embodiments, the HEW device 104 and/or the master station 102 are configured to perform the methods and functions herein described in conjunction with FIGS. 1-7.

Figure 2:
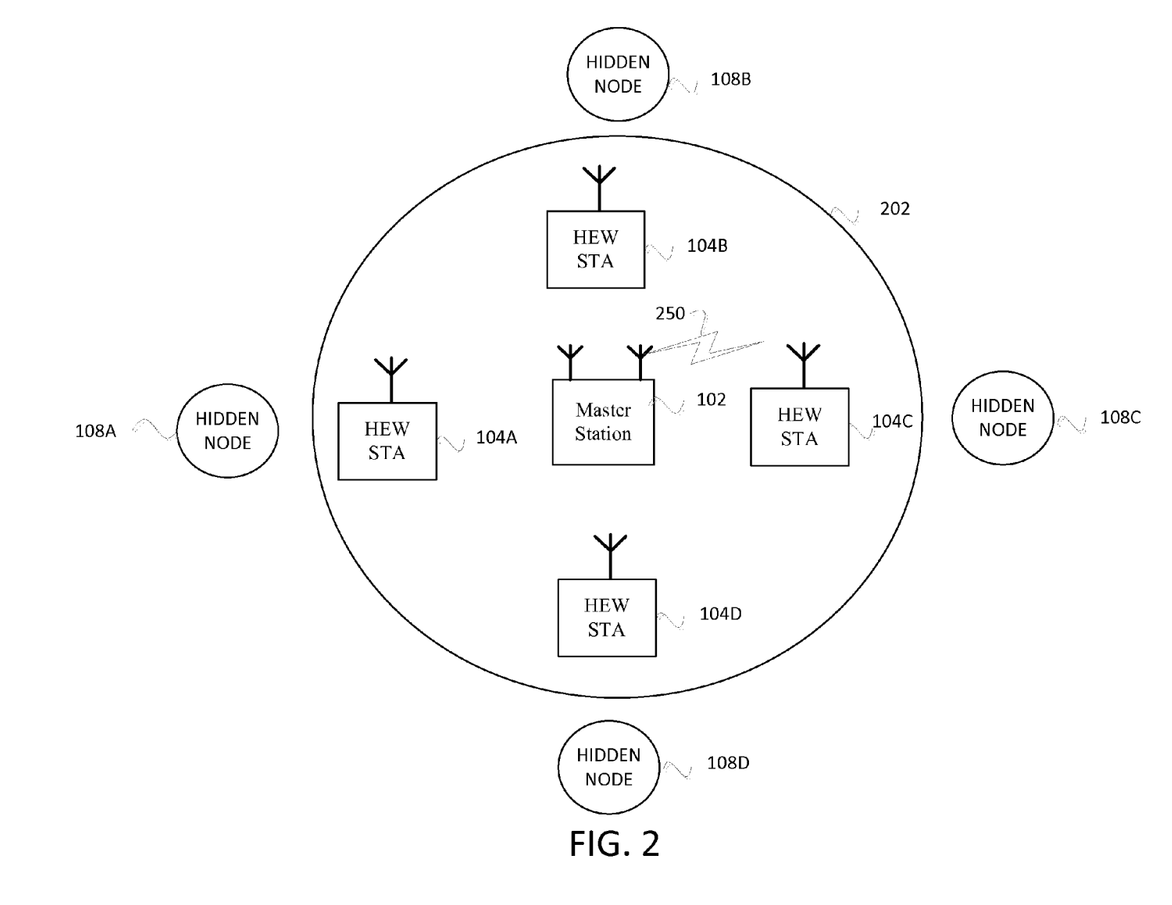
FIG. 2 illustrates the hidden node problem for downlink transmissions in accordance with some embodiments.

FIG. 2 illustrates the hidden node problem for downlink transmissions in accordance with some embodiments. Illustrated in FIG. 2 are the transmission range 202 of the master station 102 and transmission 250. The master station 102 may be sending transmission 250 to HEW STA 104C. The master station 102 transmission range 202 does not include hidden node 108C. Hidden node 108C will then not receive transmission 250 and will not defer transmitting. Hidden node 108C may then transmit at the same time that master station 102 is transmitting, which may interfere with the reception of the transmission 250 to HEW STA 104C. Similarly, the master station 102 may be simultaneously transmitting using MU-MIMO or OFDMA to one or more of HEW STA 104A, HEW STA 104B, and HEW STA 104D, and the corresponding hidden node 108A, hidden node 108B, hidden node 108D may interfere with the transmission from the master station 102 due to the hidden node 108 not receiving the transmission from the master station 102.

In example embodiments, the master station 102 and HEW STAs 104 may be configured to use request-to-send and clear-to-send in an OFDMA or MU-MIMO downlink transmission so that the hidden nodes 108 will defer transmitting during the OFDMA and/or MU-MIMO downlink transmission. In example embodiments, the master station 102 and/or HEW STAs 104 may set a physical (PHY) length field or a media access control (MAC) length field to defer the hidden nodes 108.

Figure 3:
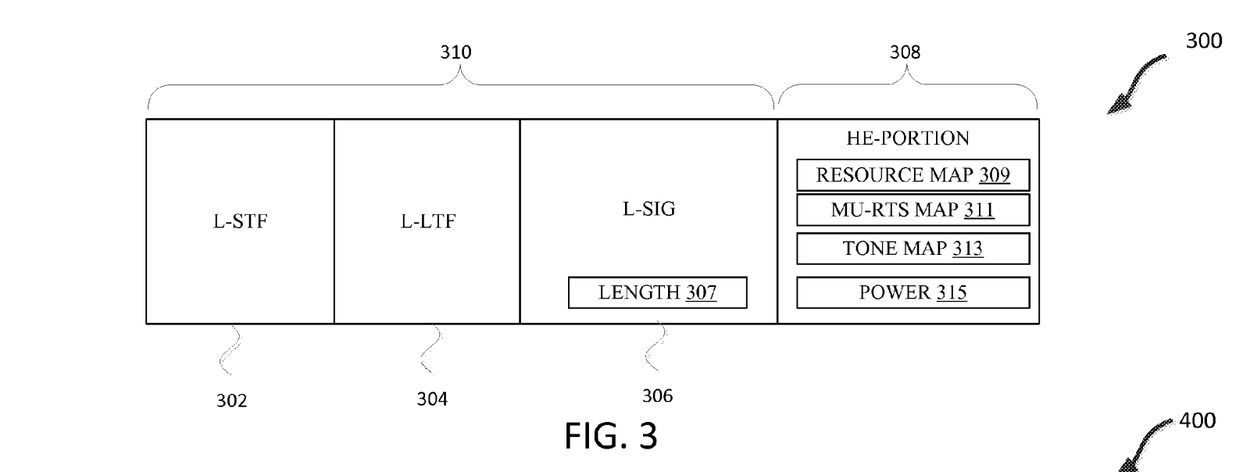
FIG. 3 illustrates an example of a MU-RTS with a length field used to defer STAs not participating in downlink OFDMA and/or MU-MIMO in accordance with some embodiments.
Figure 4:
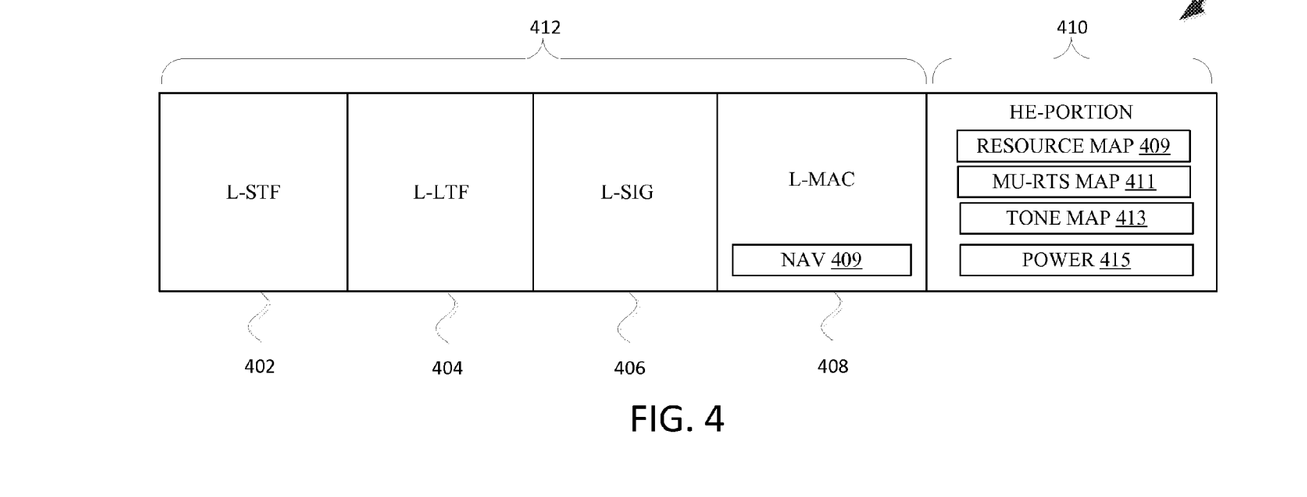
FIG. 4 illustrates an example of a MU-RTS with legacy MAC frame with a network allocation vector (NAV) field used to defer STAs not participating in the downlink OFDMA and/or MU-MIMO according to example embodiments.

FIG. 3 illustrates an example of a MU-RTS 300 with a length 307 field used to defer STAs not participating in downlink OFDMA and/or MU-MIMO in accordance with some embodiments. FIG. 4 illustrates an example of a MU-RTS 400 with legacy MAC frame with a network allocation vector (NAV) field 409 used to defer STAs not participating in the downlink OFDMA and/or MU-MIMO according to example embodiments.

FIGS. 3 and 4 will be described in conjunction with one another. FIGS. 3 and 4 illustrate example MU-RTS 300, 400, respectively, that may be transmitted by the initiator of the downlink OFDMA and/or MU-MIMO. The initiator may be the AP 102.

FIG. 3 illustrates a legacy portion 310 and a HE-portion 308. The legacy portion 310 may include a legacy short-training field (L-STF) 302, a legacy long-training field (L-LTF) 304, and legacy signal field (L-SIG) 306. The L-SIG 306 may include a length 307 field. The length 307 field may be set for a duration that indicates a length 307 so that HEW STAs 104 and legacy devices 106 not participating in the downlink OFDMA and/or MU-MIMO may defer transmitting until after the end of the transmit downlink OFDMA. For example, the length 307 field may be part of the MU-RTS 602 (FIG. 6) and may indicate a duration after the acknowledgement (ACK) 616 is completed. In example embodiments, the use of the length 307 field to defer devices until the end of the downlink OFDMA and/or MU-MIMO may be termed physical layer spoofing which may provide long protection duration that saves power decoding. For example, HEW STAs 104 such as HEW STA 104D (FIG. 2) or legacy devices 106 such as hidden node 108A that may not be participating in the downlink OFDMA and/or MU-MIMO may defer for the duration indicated in the length 307.

Illustrates in FIG. 4 are a legacy portion 412 and a HE-portion 410. The legacy portion 412 may include a L-STF 402, a L-LTF 404, L-SIG 406, and a legacy media access control (L-MAC) 408 frame, which may be appended to the L-SIG 406. The NAV 409 field may be set for a duration that indicates a length 407 so that HEW STAs 104 and legacy devices 106 not participating in the downlink OFDMA and/or MU-MIMO may defer transmitting until after the end of the transmit downlink OFDMA. For example, the NAV 409 field may be part of the MU-RTS 503 (FIG. 5), MU-RTS 1 602 (FIG. 6), or MU-RTS 606 (FIG. 6), and may indicate a duration until after the ACK 316 is completed. For example, HEW STAs 104 such as HEW STA 104D (FIG. 2) or legacy devices 106 such as hidden node 108A that may not be participating in the downlink OFDMA and/or MU-MIMO may defer for the duration indicated in the NAV 409.

The legacy portion 310, 412 of the MU-RTS 300, 400, respectively, may be sent over a 20 MHz sub-channel which may be a primary sub-channel that legacy devices 106 and/or HEW devices 104 are tuned to. In example embodiments, the legacy portion 310, 312 may be transmitted on one or more 20 MHz sub-channels. In example embodiments, the MU-RTS 300, 300 may be transmitted on one or more sub-channels, which may be 20 MHz. In example embodiments, the MU-RTS 300, 400 or HE-portion 308, 410 may be transmitted on one or more sub-channels, which may be 20 MHz or another bandwidth.

The MU-RTS 300, 400 may include a resource map 309, 409 for sub-channel allocation for the HEW STAs 104. The downlink resource map 309, 409 may include a resource allocation for a HEW STA 104 in accordance with OFDMA and/or MU-MIMO. The downlink resource map 309, 409 may include a sub-channel indication for the HEW STA 104 to transmit a MU-CTS and may include a duration and an indication of an address of the HEW STA 104.

The indication of an address of the HEW STA 104 may be an association identification (AID) generated when the HEW STA 104 associated with the master station 102, an address of the HEW STA 104, or another identification that the master station 102 may use to identify the HEW STA 104, such as a group membership identification or other identification that the master station 102 may use and that the HEW STA 104 may determine references the HEW STA 104.

The MU-RTS 300, 400 may be, for example, a new control frame, a management frame, or an IEEE 802.11ax trigger frame. The MU-RTS 300, 400 may be a multi-cast frame destined for multiple HEW STAs 104, which are the destined HEW STAs 104 of a MU-transmission from the master station 102.

The MU-RTS 300, 400 may include MU-RTS map 311, 411. The MU-RTS map 311, 411 may indicate which HEW STAs 104 are to transmit a CTS. For example, the MU-RTS map 311, 411 may be a list of indications of addresses of HEW STAs 104 and/or master stations 102. The MU-RTS 300, 400 may include a tone map 313, 415. The tone map 313, 413 may indicate one or more tones for a HEW STA 104 to use to indicate that they would like to participate in the downlink OFDMA and/or MU-MIMO, and/or in a MU-RTS. For example, MU-RTS 603 may include a tone map 311, 411.

In some embodiments, the MU-RTS 300, 400 may indicate a module and coding scheme (MCS) for HEW devices 104 to use to respond to the MU-RTS 300, 400. For example the MU-RTS 300, 400 may include a power 315, 415 the HEW STAs 104 should use to transmit CTSs, responses to a MU-RTS 300, 400 including a tone map, ACKs, and/or another response to the MU-RTS 300, 400.

The MU-RTS 300, 400 may include an indication of an address for each HEW STA 104 that is intended for the MU-RTS 300, 400.

In some embodiments one or more of the resource map 309, 409, MU-RTS map 311, 411, tone map 313, 413, and/or power 315, 415 may be combined together or indicated in another packet. For example, the resource map 409 may indicate whether or not the HEW STA 104 should transmit a CTS after receiving the resource map 309, 409 by a subfield that also indicates the resource allocation for the HEW STA 104.

Figure 5:
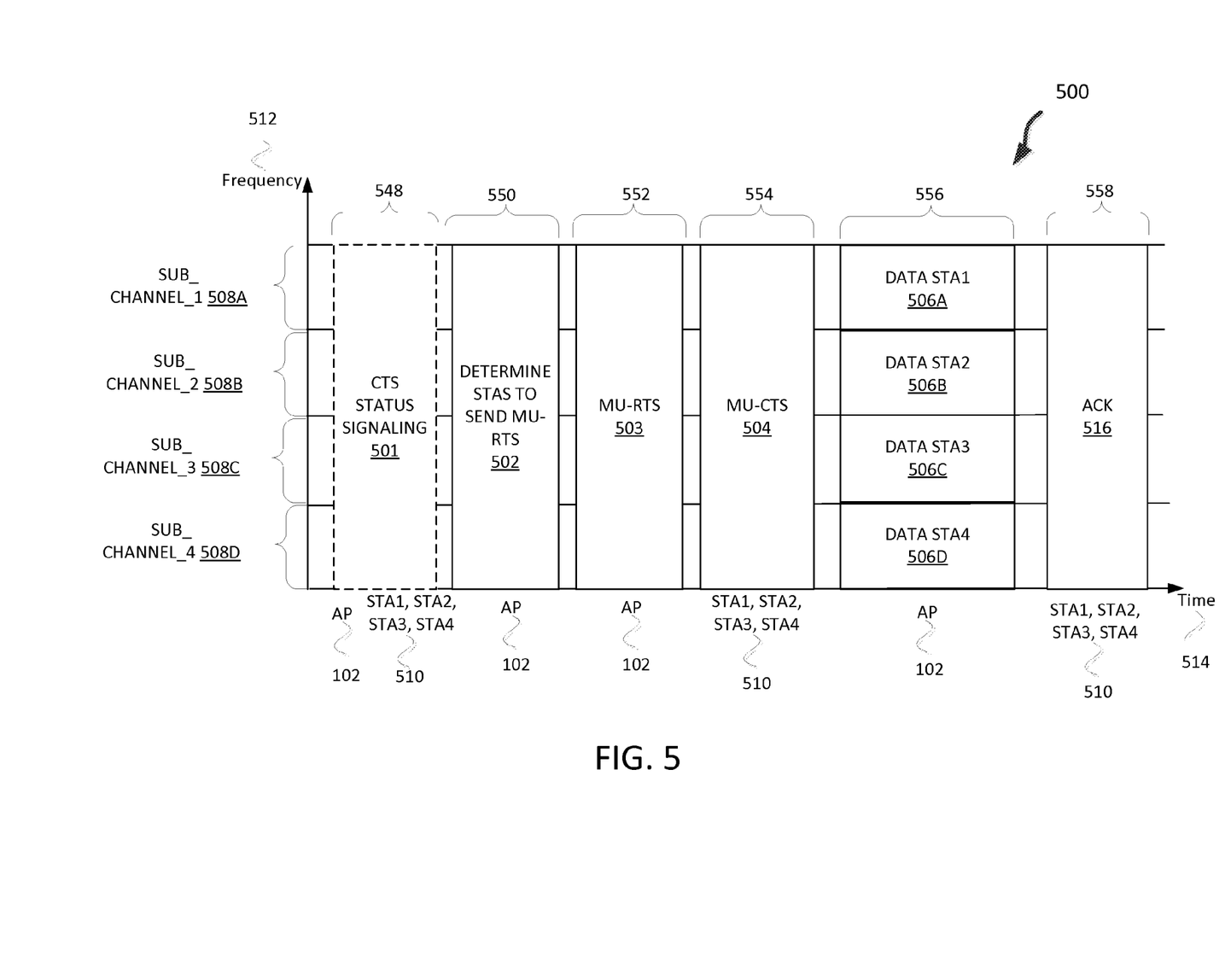
FIG. 5 illustrates a method of MU RTS/CTS downlink OFDMA and/or MU-MIMO in accordance with some embodiments.

FIG. 5 illustrates a method 500 of MU RTS/CTS downlink OFDMA and/or MU-MIMO in accordance with some embodiments. Illustrated in FIG. 5 is frequency 512 along the vertical axis and time 514 along the horizontal axis. The frequency 512 is divided into four subchannels 508A, 508B, 508C, and 508D. The subchannels 508A, 508B, 508C, and 508D may be localized, continuous or distributed subchannels 506. The STA1, STA2, STA3, and STA4 510 may be HEW STAs 104, and may be referred to singularly or collectively as STA(s) 510. In example embodiments, the number of subchannels 508 and size of the subchannels 508 may be different.

The method 500 may optionally begin at operation 548 with CTS status signaling 501 between the master station 102 and STAs 510. For example, one of the STAs, STA1, STA2, STA3, STA4 510 may send feedback to the master station 102 to announce that the STA 510 does not want to send a CTS. In some embodiments a STA 510 may send signals to the master station 102. The signals may be signal quality reports or other communications. For example, the signals may be past multi-user data downloads and acknowledgements. The master station 102 may use the signals to determine that the STA 510 will not participate in the MU-RTS/MU-CTS.

The method 500 continues at operation 550 with determine STAs 510 to send MU-RTSs 502. The master station 102 may use the signals or other information to select a group of the STAs 510 to send the MU-RTS 503. The master station 102 may select only the STAs 510 that that are going to receive data in a subsequent step.

The master station 102 may select the STAs 510 based on the signal to noise ratio of communication with the STA 510. The master station 102 may select STAs 510 based on a distance of the STAs 510 from the master station 102. The master station 102 may select the STAs 510 based on feedback from the STA 510. The master station 102 may select STAs 510 based on the packet error probability, which may be a good way to determine whether or there is a hidden node 108. The master station 102 may select STAs 510 based on a combination of two or more of the criteria disclosed herein. The master station 102 may select the STAs 510 based on trying to increase spatial reuse. For example, the master station 102 may reduce the MCS of a STA 510 to reduce the effects of the interference caused by a hidden node 108, and not select the STA 510 for transmitting a CTS. In this way the master station 102 may increase the likelihood that the hidden node 108 and STA 510 may operate concurrently or use spatial reuse. The master station 102 may determine to select a STA 510 based on a STA 510 signaling that it does not want to or that it wants to transmit a CTS. The MU-RTS 502 may merely indicate that the STA 510 may transmit a CTS and the STA 510 may determine itself whether or not to transmit the CTS.

The master station 102 may also determine MCS parameters and power parameters to send to the STAs 510 for the STAs 510 MU-CTS response and/or ACK 516. Although indicated as taking time 514, the master station 102 may determine the STAs 510 to send MU-RTS 502 in a parallel operation or prior to the method 500 beginning.

The method 500 continues at operation 552 with the master station 102 transmitting MU-RTS 503 to STA1, STA2, STA3, and STA4 510. For example, the master station 102 may transmit a RTS to each of STA1, STA2, STA3, and STA4 510 on their respective subchannels 508. In some embodiments, the master station 102 may transmit a MU-RTS 503 on a common subchannel 508, such as a primary subchannel, that may be used by legacy devices 106 as well. In some embodiments, the master station 102 may transmit the MU-RTS 503 on the subchannels 508 or a different subchannel which may be a different size or bandwidth than the subchannels 508.

The MU-RTS 503 may include a deferral duration for HEW devices 104, legacy devices 106, and/or master stations 102 that are not part of the MU RTS/CTS downlink OFDMA and/or MU-MIMO. In example embodiments, the deferral duration may include multiple downlink data transmissions. The MU-RTS 503 may include a resource map 309, 409 as described herein.

In some embodiments the MU-RTS 503 may include a MU-RTS MAP 311, 411 that indicates which STAs 510 should or may transmit the MU-CTS 504. In some embodiments the MU-RTS 503 may include the power 315, 415 which may indicate a MCS and/or power for the STAs 510 to use in one or more of the responses to the MU-RTS 503.

In some embodiments the master station 102 may select which STAs 510 to transmit the MU-RTS 503. The MU-RTS 503 may be in accordance with MU-RTS 300 or MU-RTS 400.

The method 500 continues at operation 554 with STA1, STA2, STA3, and STA4 510 transmitting MU-CTSs 504 to the master station 102. For example, STA1, STA2, STA3, and STA4 510 may transmit the MU-CTS 504 simultaneously on their respective subchannels. In some embodiments, the STAs 510 may transmit the MU-CTS 504 on the subchannels 508 or a different subchannel which may be a different size or bandwidth than the subchannels 508. The STAs 510 may simultaneously transmit a MU-CTS 504 on two or more channels. For example, the STA 510 may transmit an indication that the STA 510 transmitted a MU-CTS 504 on a tone indicated in the tone map 313, 413, and transmit a MU-CTS 504 on a primary channel to indicate to legacy devices 106 to defer transmitting.

The MU-CTS 504 may notify hidden nodes 108 to defer transmitting. In example embodiments, the MU-CTS 504 may indicate a time to defer that includes operation 556 and operation 558, and, in some embodiments, the time may include multiple data download operations 556 and ACKs operations 558. The STAs 510 may transmit MU-CTS 504 with a HEW preamble on their respective subchannels 508. The STAs 510 may transmit MU-CTS 504 in accordance with the resource map 309, 409, MU-RTS map 311, 411, and or power 315, 415, as described herein. The STAs 510 may transmit the MU-CTS 504 in accordance with a tone map 313, 413 so that the AP 102 can determine which STAs 510 actually transmitted MU-CTSs 540.

In some embodiments the STAs 510 may determine whether or not to transmit a MU-CTS 504 based on the MU-RTS 503 and other information. For example a STA 510 may determine that it is not included in a MU-RTS map 311, 411 and not transmit a MU-CTS 504. The STA 510 may determine that it is included in a MU-RTS map 311, 511 and transmit a MU-CTS 504. The STA 510 may determine that it is included in a MU-RTS map 311, 511 and determine not to transmit a MU-CTS 504 based on other information such as the amount of interference caused by a hidden node 108.

The method 500 may continue at operation 556 with the master station 102 transmitting data 506A, 506B, 506C, and 506D to STAT, STA2, STA3, and STA4 510, respectively. For example, the master station 102 may transmit a resource map 309, 409 as part of the MU-RTS 502 to the STAs 510 and then transmit data 506 according to the resource map 309, 409. In some embodiments, the master station 102 may transmit a downlink resource map 311, 411 as a preamble to the data 506.

The method 500 may continue at operation 558 with the STAs 510 sending ACKs 516 to the master station 102 in response to the data 506. For example, each STA 510 may transmit an ACK 516 using a sub-channel 508 that was part of the resource map 309, 409 allocated to the STA 510. In example embodiments, the ACKs 516 may be block ACKs (BAs) 516. In some embodiments, each STA 510 may transmit an ACK 516 using a sub-channel 508 or tones that is indicated for the STA 510 to transmit the ACK 516 within.

Figure 6:
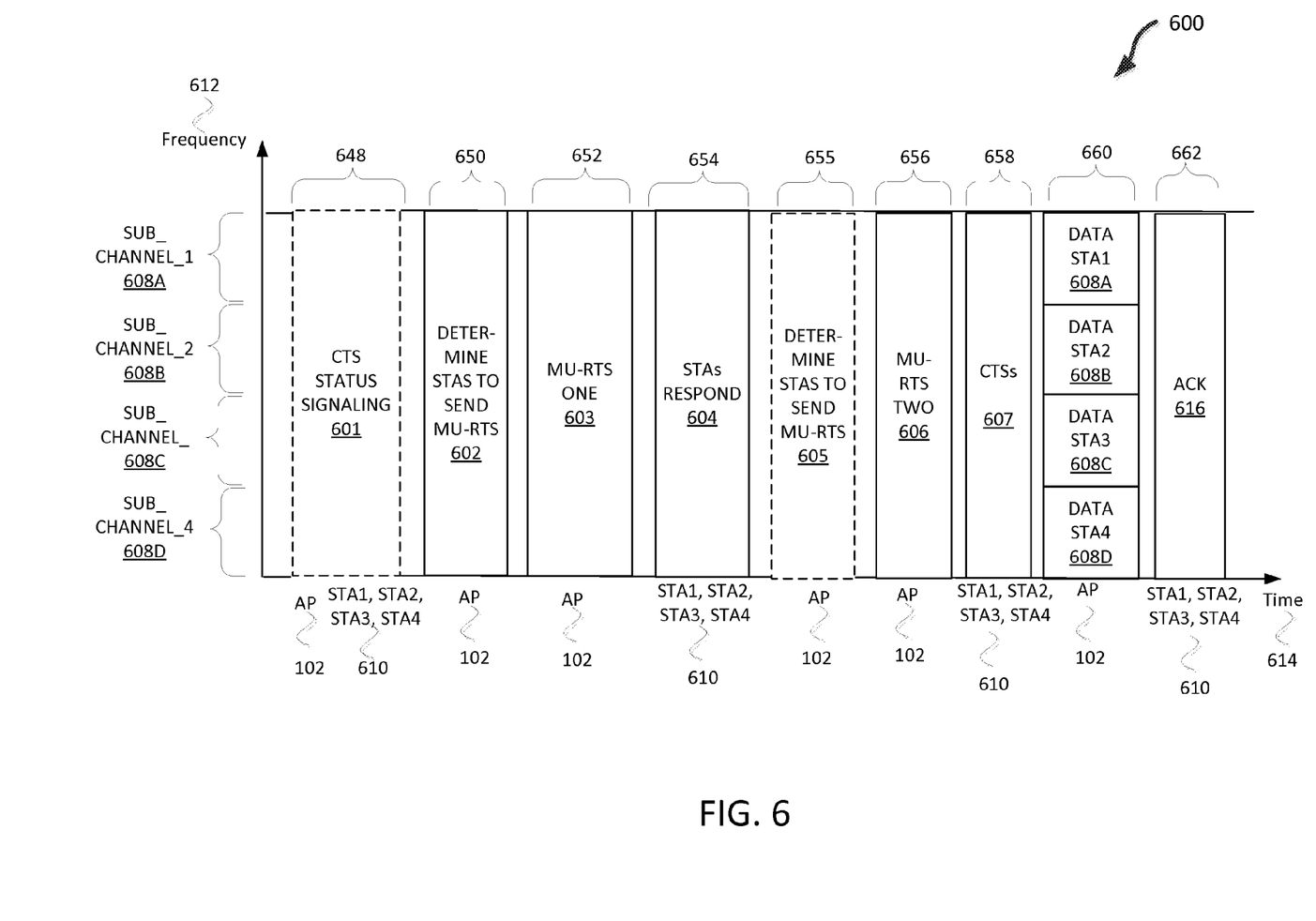
FIG. 6 illustrates a method of MU RTS/CTS downlink OFDMA and/or MU-MIMO in accordance with some embodiments.

FIG. 6 illustrates a method 600 of MU RTS/CTS downlink OFDMA and/or MU-MIMO in accordance with some embodiments. Illustrated along the vertical axis is frequency 612 and along the horizontal axis is time 614.

The method 600 may optionally begin at operation 648 with CTS status signaling 601 between the master station 102 and STAs 610. For example, one of the STAs, STA1, STA2, STA3, STA4 610 may send feedback to the master station 102 to announce that the STA 610 does not want to send a CTS. In some embodiments a STA 610 may send signals to the master station 102. The signals may be signal quality reports or other communications. For example, the signals may be past multi-user data downloads and acknowledgements. The master station 102 may use the signals to determine that the STA 610 will not participate in the MU-RTS/MU-CTS.

The method 600 continues at operation 650 with determine STAs to send MU-RTSs 602. The master station 102 may use the CTS status signaling 601 or other information to select a group of the STAs 610 to send the MU-RTS 1 603. The master station 102 may select only the STAs 610 that that are going to receive data in a subsequent step. The master station 102 may select the STAs 610 as described herein in conjunction with FIG. 5.

The method 600 continues at operation 652 with the master station 102 transmitting a MU-RTS 1 603. The MU-RTS One 603 may include a tone map 313, 413. The tone map 313, 413 may map tones to STA1, STA2, STA3, STA4 610, which may be referred to collectively or singularly as STA 610. The MU-RTS One 603 may include a resource map 309, 409. The resource map 309, 409 may map sub-channels 608 to STAs 610. The MU-RTS One 603 may include MU-RTS map 311, 411 and/or power 315, 415.

The method 600 continues at operation 654 with STAs respond 604. For example, the STAs 610 in the tone map 313, 413 may respond in accordance with the tone map 313, 413. The STAs 610 may transmit a STF, LTF, and response indicating that the STA 610 would like to participate in the downlink OFDMA and/or MU-MIMO. In some embodiments the STAs 610 may transmit a response that indicates that the STA 610 would not like to participate in the downlink OFDMA and/or MU-MIMO. STAs 610 may not respond to the tone map 313,413 if they do not receive the tone map 313, 413 or are unable to decode the tone map 313,413. In example embodiments, a STA 610 may not respond to the tone map 313,413 if the STA 610 does not want to participate in the downlink OFDMA and/or MU-MIMO. In some embodiments the STAs 610 may transmit a response to indicate that the STA 610 would or would not like to transmit a CTS 607.

The response of the STAs 610 may include a deferral as in a physical layer length 307 or a MAC layer NAV 409 field. In example embodiments, the STAs 610 may transmit a packet that includes a deferral duration in one sub-channel and respond to the master station 102 on an assigned tone or on another subchannel. In example embodiments, the STAs 610 may transmit a MU-CTS, e.g. MU-CTS 504, as part of the STA's response 604. In example embodiments, the deferral duration may include multiple downlink data transmissions. The operation 654 and operation 656 may be combined.

The method 600 continues at operation 655 with determine STAs to send MU-RTS 605. The master station 102 may determine which STAs 610 to send the MU-RTS Two 606 to based on the information as described in conjunction with operation 650 and FIG. 5 as well as the information received from STAs Response 604. For example, the master station 102 may determine that since a STA 610 did not respond to the MU-RTS One 603 that it will not be included in the MU-RTS Two 606 or that the STA 610 may or may not be requested or instructed to transmit a CTS 607. The AP 102 may determine both whether a STA 610 will participate in operation 660 to receive data and in operation 658 where the STA 610 is instructed to send a CTS 607.

The method 600 continues at operation 656 with MU-CTS Two being transmitted by the master station 102 to STAs 610 selected by the master station 102. The MU-CTS Two 606 may include one or more of a resource map 309, 409, MU-RTS map 311, 411, and power 315, 415. In some embodiments, the MU-CTS trigger operation 606 is an indication to the STAs 610 to transmit a CTS.

The method 600 continues at operation 658 with the STAs 610 transmitting a CTS 607. The CTS 607 may be a legacy CTS, and may include a deferral duration such as a PHY layer length 307 or MAC NAV 409 as described in conjunction with FIGS. 3 and 4. The STAs 610 indicated in the MU-RTS Two 606 may transmit, prior to the start of operation 660, a CTS 607 to defer hidden nodes. The STA 610 may have also been instructed to transmit an indication that a CTS 607 was transmitted in accordance with a tone map 313, 413, and/or a MU-RTS map 311, 411. The deferral duration may include a duration that includes operation 662. In example embodiments, the deferral duration may include a duration that includes multiple downlink data 660 and/or ACKs 616 or other operations of method 600 being transmitted by the AP 102 or STAs 610.

The method 600 continues at operation 660 with downlink data 608 being transmitted from the AP 102 to the STAs 610. Operation 609 may be delayed to give the STAs 1310 enough time to transmit the CTS. Operation 660 may include a preamble with a resource map 309, 409. Operation 660 may include a deferral duration such as PHY layer length 307 or MAC layer NAV 409. In example embodiments, the deferral duration may include multiple downlink data 660 transmissions. The method 600 may continue at operation 662 with the STAs 662 transmitting ACKs or BA to the AP 102 in response to the data 608 and in accordance with a resource map 309, 409 that was transmitted to the STAs 610 in a previous operation. The method 600 may iterate and, in some embodiments, iterate and take advantage of previously transmitted deferral times.

Figure 7:
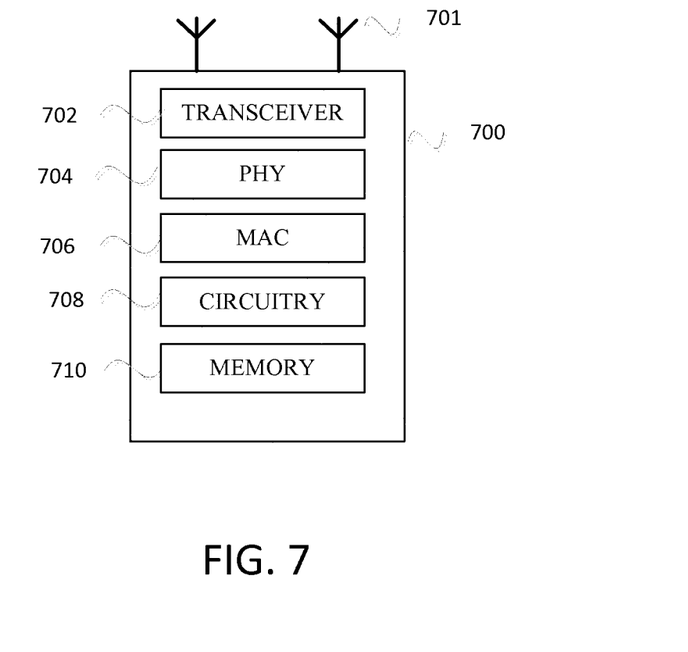
FIG. 7 illustrates a high-efficiency wireless (HEW) device in accordance with some embodiments.

FIG. 7 illustrates a HEW device in accordance with some embodiments. HEW device 700 may be an HEW compliant device that may be arranged to communicate with one or more other HEW devices, such as HEW STAs 104 (FIG. 1) or master station 102 (FIG. 1) as well as communicate with legacy devices 106 (FIG. 1). HEW STAs 104 and legacy devices 106 may also be referred to as HEW devices and legacy STAs, respectively. HEW device 700 may be suitable for operating as master station 102 (FIG. 1) or a HEW STA 104 (FIG. 1). In accordance with embodiments, HEW device 700 may include, among other things, a transmit/receive element 701 (for example an antenna), a transceiver 702, PHY circuitry 704, and MAC circuitry 706. PHY circuitry 704 and MAC circuitry 706 may be HEW compliant layers and may also be compliant with one or more legacy IEEE 802.11 standards. MAC circuitry 706 may be arranged to configure PPDUs and arranged to transmit and receive PPDUs, among other things. HEW device 700 may also include circuitry 708 and memory 710 configured to perform the various operations described herein. The circuitry 708 may be coupled to the transceiver 702, which may be coupled to the transmit/receive element 701. While FIG. 7 depicts the circuitry 708 and the transceiver 702 as separate components, the circuitry 708 and the transceiver 702 may be integrated together in an electronic package or chip.

In some embodiments, the MAC circuitry 706 may be arranged to contend for a wireless medium during a contention period to receive control of the medium for the HEW control period and configure an HEW PPDU. In some embodiments, the MAC circuitry 706 may be arranged to contend for the wireless medium based on channel contention settings, a transmitting power level, and a CCA level.

The PHY circuitry 704 may be arranged to transmit the HEW PPDU. The PHY circuitry 704 may include circuitry for modulation/demodulation, upconversion/downconversion, filtering, amplification, etc. In some embodiments, the circuitry 708 may include one or more processors. The circuitry 708 may be configured to perform functions based on instructions being stored in a RAM or ROM, or based on special purpose circuitry. The circuitry 708 may be termed processing circuitry in accordance with some embodiments. In some embodiments, the circuitry 708 may be configured to perform one or more of the functions and/or methods described herein and/or in conjunction with FIGS. 1-7 such as generating, transmitting, receiving, and/or operating in accordance with MU-RTS 300, 400.

In some embodiments, the transmit/receive elements 701 may be two or more antennas that may be coupled to the PHY circuitry 704 and arranged for sending and receiving signals including transmission of the HEW packets. The transceiver 702 may transmit and receive data such as HEW PPDU and packets that include an indication that the HEW device 700 should adapt the channel contention settings according to settings included in the packet. The memory 710 may store information for configuring the other circuitry to perform operations for configuring and transmitting HEW packets and performing the various operations to perform one or more of the functions and/or methods described herein and/or in conjunction with FIGS. 1-7 such as generating, transmitting, receiving, and/or operating in accordance with MU-RTS 300, 400.

In some embodiments, the HEW device 700 may be configured to communicate using OFDM communication signals over a multicarrier communication channel. In some embodiments, HEW device 700 may be configured to communicate in accordance with one or more specific communication standards, such as the Institute of Electrical and Electronics Engineers (IEEE) standards including IEEE 802.11-2012, 802.11n-2009, 802.11ac-2013, 802.11ax, DensiFi, standards and/or proposed specifications for WLANs, or other standards as described in conjunction with FIG. 1, although the scope of the invention is not limited in this respect as they may also be suitable to transmit and/or receive communications in accordance with other techniques and standards. In some embodiments, the HEW device 700 may use 4× symbol duration of 802.11n or 802.11ac.

In some embodiments, an HEW device 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as 802.11 or 802.16, or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an LCD screen including a touch screen.

The transmit/receive element 701 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although the HEW device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The following examples pertain to further embodiments. Example 1 is an apparatus of a high-efficiency wireless local area network (HEW) master station. The apparatus includes circuitry configured to: select a first group of stations to transmit a multi-user request-to-send (MU-RTS) transmission to, where the first group of stations is selected from a plurality of stations for a transmission opportunity; generate a MU-RTS packet for the first group of stations; and transmit the MU-RTS packet to the first group of stations.

In Example 2, the subject matter of Example 1 can optionally include where the circuitry is further configured to: wait a period of time for the first group of stations to transmit multi-user clear-to-send (MU-CTS) packets in response to the MU-RTS packet; and transmit data to a second group of stations in accordance with orthogonal frequency division multiple-access (OFDMA) and/or multi-user multiple-input and multiple output (MU-MIMO) within the transmission opportunity, where the second group of stations is one or more stations of the first group of stations.

In Example 3, the subject matter of Example 1 or 2 can optionally include where the data comprises a preamble that comprises a resource map that indicates for each of the second group of stations a sub-channel to receive data on, and where each of the sub-channels is a different part of the bandwidth of the wireless medium in accordance with OFDMA.

In Example 4, the subject matter of any of Examples 1-3 can optionally include where the MU-RTS indicates that some of the first group of stations should transmit a multi-user clear-to-send (MU-CTS) and others of the first group of stations should not transmit a MU-CTS.

In Example 5, the subject matter of any of Examples 1-4 can optionally include where the MU-RTS includes a MU-RTS map that indicates the first group of stations should respond with a multi-user clear-to-send (MU-CTS).

In Example 6, the subject matter of any of Examples 1-5 can optionally include where the MU-RTS further comprises at least one from the following group: a resource map that indicates a subchannel for each of the first group of stations to receive data on, a MU-RTS map that indicates a sub-channel for each of the first group of stations to respond on with a multi-user clear-to-send (MU-CTS) packet, a MU-RTS map that indicates a sub-channel for each of the first group of stations to respond on with an indication the station sent a multi-user clear-to-send (MU-CTS) packet, and a power control indication for at least one of the stations of the one or more stations.

In Example 7, the subject matter of any of Examples 1-6 can optionally include where the circuitry is further configured to: receive status signals from a station of the first group of stations; and wherein the select is based on the status signals.

In Example 8, the subject matter of any of Examples 1-7 can optionally include where the status signals indicate at least one from the following group: a signal to noise ratio, a packet error probability between the one or more stations and the master station, a distance of station from the HEW master station, and an indication of a hidden node.

In Example 9, the subject matter of any of Examples 1-8 can optionally include where the circuitry is further configured to: adjust the modulation and coding scheme (MCS) of the station based on the station signals to reduce the data rate of the communication and to reduce the need for the station to transmit a clear-to-send.

In Example 10, the subject matter of any of Examples 1-9 can optionally include where the circuitry is further configured to: receive a packet from a station that indicates that the station does not want the MU-RTS transmitted to the station; and not select the station as part of the first group of stations based on the packet.

In Example 11, the subject matter of any of Examples 1-10 can optionally include where the MU-RTS comprises a tone map that indicates tones for the first group of stations to respond on; and where the circuitry is further configured to: receive one or more responses from the first group of stations in accordance with the tone map; select a second group of stations from the first group of stations based on the one or more responses; generate a second MU-RTS packet for the second group of stations; and transmit the second MU-RTS packet to the second group of stations.

In Example 12, the subject matter of any of Examples 1-11 can optionally include where the second group of stations are the stations from the first group of stations that responded to the MU-RTS packet.

In Example 13, the subject matter of any of Examples 1-12 can optionally include where the second group of stations are the stations from the first group of stations that responded to the MU-RTS packet and indicated they wanted to transmit a multi-user clear-to-send (MU-CTS).

In Example 14, the subject matter of any of Examples 1-13 can optionally include where the second MU-RTS packet includes one or more of a MU-RTS map, a resource map, and a power indication.

In Example 15, the subject matter of any of Examples 1-4 can optionally include where the second MU-RTS indicates that some of the second group of stations should transmit a multi-user clear-to-send (MU-CTS) and others of the second group of stations should not transmit a MU-CTS.

In Example 16, the subject matter of any of Examples 1-15 can optionally include where the first group of stations are HEW stations and the HEW master station is an Institute of Electrical and Electronic Engineers (IEEE) 802.11ax access point.

In Example 17, the subject matter of any of Examples 1-16 can optionally include memory coupled to the circuitry.

In Example 18, the subject matter of Example 17 can optionally include one or more antennas coupled to the circuitry.

Example 19 is a method performed by a high-efficiency wireless local area network (WLAN) (HEW) master station. The method including selecting a first group of stations to transmit a multi-user request-to-send (MU-RTS) transmission to; generating a MU-RTS packet for the first group of stations; and transmitting the MU-RTS packet to the first group of stations.

In Example 20, the subject matter of Example 19 can optionally include where the MU-RTS indicates that some of the first group of stations should transmit a multi-user clear-to-send (MU-CTS) and others of the first group of stations should not transmit a MU-CTS.

In Example 21, the subject matter of Examples 19 and 20 can optionally include where the MU-RTS further comprises at least one from the following group: a resource map that indicates a subchannel for each of the first group of stations to receive data on, a MU-RTS map that indicates a sub-channel for each of the first group of stations to respond on with a multi-user clear-to-send (MU-CTS) packet, a MU-RTS map that indicates a sub-channel for each of the first group of stations to respond on with an indication the station sent a multi-user clear-to-send (MU-CTS) packet, and a power control indication for at least one of the stations of the one or more stations.

Example 22 is an apparatus of a high-efficiency (HE) wireless local area network (HEW) device including circuitry configured to: receive a multi-user request-to-send (MU-RTS) packet, where the MU-RTS packet comprises a RTS map that indicates whether the HEW device should transmit a multi-user clear-to-send (MU-CTS); and transmit a MU-CTS packet if the MU-RTS indicates the HEW device should transmit the MU-CTS.

In Example 23, the subject matter of Example 22 can optionally include memory coupled to the circuitry; and one or more antennas coupled to the circuitry.

Example 24 is a non-transitory computer-readable storage medium that stores instructions for execution by one or more processors of a high-efficiency wireless local-area network (WLAN) (HEW) master station, the operations to configure the one or more processors to cause the HEW master station to: select a first group of stations to transmit a multi-user request-to-send (MU-RTS) transmission to; generate a MU-RTS packet for the first group of stations; and transmit the MU-RTS packet to the first group of stations.

In Example 25, the subject matter of Example 24 can optionally include where the MU-RTS indicates that some of the first group of stations should transmit a multi-user clear-to-send (MU-CTS) and others of the first group of stations should not transmit a MU-CTS.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a high-efficiency (HE) master station configured to operate in a wireless local area network (WLAN), the apparatus comprising: memory; and, circuitry coupled to the memory, the circuitry configured to:
    select a first group of stations to transmit a multi-user request-to-send (MU-RTS) transmission to, wherein the first group of stations is selected from a plurality of stations for a transmission opportunity;
    generate a MU-RTS packet for the first group of stations, wherein the MU-RTS comprises a MU-RTS map that indicates for each of the first group of stations a sub-channel to respond on with a clear-to-send (CTS) packet and an address for each of the first group of stations, and wherein the MU-RTS indicates that more than one station of the first group of stations is to transmit the CTS packet on a same sub-channel; and
    transmit the MU-RTS packet to the first group of stations.

2. The apparatus of the HE master station of claim 1, wherein the circuitry is further configured to:
    wait a period of time for the first group of stations to transmit CTS packets in response to the MU-RTS packet; and
    transmit data to a second group of stations in accordance with orthogonal frequency division multiple-access (OFDMA) and/or multi-user multiple-input and multiple output (MU-MIMO) within the transmission opportunity, wherein the second group of stations is one or more stations of the first group of stations.

3. The apparatus of the HE master station of claim 2, wherein the data comprises a preamble that comprises a resource map that indicates for each of the second group of stations a sub-channel to receive data on, and wherein each of the sub-channels of the second group is a different part of a bandwidth of a wireless medium in accordance with OFDMA.

4. The apparatus of the HE master station of claim 1, wherein the MU-RTS indicates that some of the first group of stations should transmit the CTS packet and others of the first group of stations should not transmit the CTS packet.

5. The apparatus of the HE master station of claim 1, wherein MU-RTS includes a MU-RTS map that indicates the first group of stations should respond with CTS packets.

6. The apparatus of the HE master station of claim 1, wherein the MU-RTS further comprises at least one from a following group:
    a resource map that indicates a subchannel for each of the first group of stations to receive data on, a MU-RTS map that indicates a sub-channel for each of the first group of stations to respond on with an indication a station sent the CTS packet, and a power control indication for at least one of the stations of the first group of stations.

7. The apparatus of the HE master station of claim 1, wherein the circuitry is further configured to:
receive status signals from a station of the first group of stations; and
wherein the select is based on the status signals.

8. The apparatus of the HE master station of claim 7, wherein the status signals indicate at least one from a following group:
a signal to noise ratio, a packet error probability between the first group of stations and the master station, a distance of a station from the HE master station, and an indication of a hidden node.

9. The apparatus of the HE master station of claim 8, wherein the circuitry is further configured to:
adjust a modulation and coding scheme (MCS) of the station based on the station signals to reduce a data rate of a communication and to reduce a need for the station to transmit a clear-to-send.

10. The apparatus of the HE master station of claim 1, wherein the circuitry is further configured to:
receive a packet from a station that indicates that the station does not want the MU-RTS transmitted to the station; and
not select the station as part of the first group of stations based on the packet.

11. The apparatus of the HE master station of claim 1, wherein the MU-RTS comprises a tone map that indicates tones for the first group of stations to respond on; and
wherein the circuitry is further configured to:
receive one or more responses from the first group of stations in accordance with the tone map;
select a second group of stations from the first group of stations based on the one or more responses;
generate a second MU-RTS packet for the second group of stations; and
transmit the second MU-RTS packet to the second group of stations.

12. The apparatus of the HE master station of claim 11, wherein the second group of stations are the stations from the first group of stations that responded to the MU-RTS packet.

13. The apparatus of the HE master station of claim 12, wherein the second group of stations are the stations from the first group of stations that responded to the MU-RTS packet and indicated they wanted to transmit the CTS.

14. The apparatus of the HE master station of claim 12, wherein the second MU-RTS packet includes one or more of a MU-RTS map, a resource map, and a power indication.

15. The apparatus of the HE master station of claim 11, wherein the second MU-RTS indicates that some of the second group of stations should transmit the CTS and others of the second group of stations should not transmit the CTS.

16. The apparatus of the HE master station of claim 1, wherein the first group of stations are HE stations and the HE master station is an Institute of Electrical and Electronic Engineers (IEEE) 802.11ax access point.

17. The apparatus of the HE master station of claim 1, further comprising one or more antennas coupled to the circuitry.

18. A method performed by an apparatus of a high-efficiency (HE) master station, the method comprising:

selecting a first group of stations to transmit a multi-user request-to-send (MU-RTS) transmission to;
generating a MU-RTS packet for the first group of stations, wherein the MU-RTS comprises a MU-RTS map that indicates for each of the first group of stations a sub-channel to respond on with a clear-to-send (CTS) packet, and an address for each of the first group of stations, and wherein the MU-RTS indicates that more than one station of the first group of stations is to transmit the CTS packet on a same sub-channel; and
transmitting the MU-RTS packet to the first group of stations.

19. The method of claim 18, wherein the MU-RTS indicates that some of the first group of stations should transmit the CTS packet and others of the first group of stations should not transmit the CTS packet.

20. The method of claim 18, wherein the MU-RTS further comprises at least one from a following group:
a resource map that indicates a subchannel for each of the first group of stations to receive data on, a MU-RTS map that indicates a sub-channel for each of the first group of stations to respond on with an indication a station sent the CTS packet, and a power control indication for at least one of the stations of the first group of stations.

21. An apparatus of a high-efficiency (HE) device, comprising: memory; and, circuitry coupled to the memory, the circuitry configured to:
decode a multi-user request-to-send (MU-RTS) packet, wherein the MU-RTS comprises a MU-RTS map that indicates a sub-channel for the HE device to respond on with a clear-to-send (CTS) packet, and an address of the HE device, and wherein the MU-RTS indicates that more than one station of a first group of stations is to transmit the CTS packet on a same sub-channel; and
configure the HE device to transmit the CTS packet if the MU-RTS indicates the HE device should transmit the CTS packet.

22. The apparatus of claim 21, further comprising one or more antennas coupled to the circuitry.

23. A non-transitory computer-readable storage medium that stores instructions for execution by one or more processors of an apparatus of a high-efficiency (HE) master station, the operations to configure the one or more processors to cause the apparatus to:
select a first group of stations to transmit a multi-user request-to-send (MU-RTS) transmission to;
generate a MU-RTS packet for the first group of stations, wherein the MU-RTS comprises a MU-RTS map that indicates for each of the first group of stations a sub-channel to respond on with a clear-to-send (CTS) packet, and an address for each of the first group of stations, and wherein the MU-RTS indicates that more than one station of the first group of stations is to transmit the CTS packet on a same sub-channel; and
configure the HE master station to transmit the MU-RTS packet to the first group of stations.

24. The non-transitory computer-readable storage medium of claim 23, wherein the MU-RTS indicates that some of the first group of stations should transmit the CTS and others of the first group of stations should not transmit the CTS.

* * * * *